US007953741B2

(12) United States Patent
Shih et al.

(10) Patent No.: US 7,953,741 B2
(45) Date of Patent: May 31, 2011

(54) ONLINE RANKING METRIC

(75) Inventors: Lawrence Wen-Kai Shih, Mountain View, CA (US); Adam Sah, Santa Cruz, CA (US); Daniel S. Tarlow, Toronto (CA); Beverly Yang, Cupertino, CA (US); Ryohei Takahashi, Mountain View, CA (US); Christopher Rohrs, Mountain View, CA (US)

(73) Assignee: Google Inc., Mountain View, CA (US)

( * ) Notice: Subject to any disclaimer, the term of this patent is extended or adjusted under 35 U.S.C. 154(b) by 369 days.

(21) Appl. No.: 11/874,893

(22) Filed: Oct. 18, 2007

(65) Prior Publication Data
US 2008/0097987 A1 Apr. 24, 2008

Related U.S. Application Data

(60) Provisional application No. 60/862,003, filed on Oct. 18, 2006.

(51) Int. Cl.
*G06F 17/30* (2006.01)
(52) U.S. Cl. ........................................ 707/751; 707/732
(58) Field of Classification Search .................. 707/1–7
See application file for complete search history.

(56) References Cited

U.S. PATENT DOCUMENTS

| 6,697,821 | B2 | 2/2004 | Ziff et al. |
| 7,111,000 | B2 | 9/2006 | Wen et al. |
| 7,167,193 | B2 * | 1/2007 | Goetzke et al. ............... 347/223 |
| 7,353,246 | B1 * | 4/2008 | Rosen et al. .................. 709/202 |
| 2002/0103798 | A1 | 8/2002 | Abrol et al. |
| 2004/0133557 | A1 | 7/2004 | Wen et al. |
| 2004/0249821 | A1 * | 12/2004 | Nies et al. ..................... 707/100 |
| 2005/0216434 | A1 | 9/2005 | Haveliwala et al. |
| 2006/0047649 | A1 * | 3/2006 | Liang ............................... 707/4 |
| 2006/0064411 | A1 * | 3/2006 | Gross et al. ....................... 707/3 |

(Continued)

FOREIGN PATENT DOCUMENTS
WO 2004/102305 11/2004

OTHER PUBLICATIONS

Michael R. Irwin, "A Guide to Understanding URLs—Working with Uniform Resource Locators on the Internet," [retrieved on Oct. 9, 2006]. Retrieved from the Internet: <URL: http://www.geocities.com/Tokyo/Towers/4385/url.txt>.

(Continued)

*Primary Examiner* — Debbie Le
(74) *Attorney, Agent, or Firm* — Fish & Richardson P.C.

(57) ABSTRACT

Methods, systems, and apparatus, including computer program products, for ranking resources. One or more signals reporting one or more actions by the plurality of users related to a respective resource are received, where a reported action is a presentation of the respective resource, an addition of the respective resource, or a deletion of the respective resource. The reported actions include one or more short deletions of the respective resource. A respective long-addition click-through rate (LACTR) is determined for the respective resource based on a number of reported presentations of the respective resource and a difference between a number of reported additions of the respective resource and a number of short deletions of the respective resource. The plurality of resources are ranked based on the respective LACTRs for the plurality of resources. The ranking of the plurality of resources are provided.

18 Claims, 8 Drawing Sheets

U.S. PATENT DOCUMENTS

| | | | |
|---|---|---|---|
| 2006/0136589 A1 | 6/2006 | Konig et al. | |
| 2006/0155764 A1* | 7/2006 | Tao | 707/104.1 |
| 2006/0235873 A1* | 10/2006 | Thomas | 707/102 |
| 2006/0288001 A1 | 12/2006 | Costa et al. | |
| 2007/0121843 A1 | 5/2007 | Atazky et al. | |
| 2007/0143266 A1 | 6/2007 | Tang et al. | |
| 2007/0266025 A1* | 11/2007 | Wagner et al. | 707/7 |

OTHER PUBLICATIONS

The Design of Software, [retrieved on Nov. 1, 2006]. Retrieved from the Internet <URL: http://discuss.joelonsoftware.com/default.asp?desig.4.66625.16>.

Roger L. Costello et al., "5-Minute Introduction to REST (Learning REST by Example)," 2005. Retrieved from the Internet: <URL: http://www.xfront.com/5-minute-intro-to-REST.ppt>.

Roger L. Costello et al., "REST (Representational State Transfer)," 2005. Retrieved from the Internet: <URL: http://www.xfront.com/REST-full.ppt>.

Roger L. Costello, "Building Web Services the REST Way," [retrieved on Oct. 9, 2006]. Retrieved from the Internet: <URL: http:www.xfront.com/REST-Web-Services.html>.

Roger L. Costello, "REST (Representational State Transfer)," last updated Jun. 26, 2002. Retrieved from the Internet: <URL: http://www.xfront.com/REST.ppt>.

U.S. Appl. No. 11/874,888, filed Oct. 18, 2007, Lawrence Wen-Kai Shih et al.

U.S. Appl. No. 11/874,889, filed Oct. 18, 2007, Lawrence Wen-Kai Shih et al.

Rappoport, "Remote Search Services for Web Sites," Dec. 1, 1999 (XP007911439) [online]. Retrieved from the Internet: http://www.mactech.com/articles/mactech/Vol.15/15.12/RemoteSearchServices/index.html [retrieved on Jan. 27, 2010], 15 pages.

Zerner, "Site Search and Retrieval Tools," (XP002278657) [online]. Retrieved from the Internet: http://www.webserver.cpg.com/features/cover/2.5/ [retrieved on Apr. 4, 2009], 12 pages.

Supplemental European Search Report for App. Ser. No. EP 07 86 8503, dated Feb. 2, 2010, 5 pages.

PCT/US2007/081864 International Preliminary Report and Written Opinion , PCT, Apr. 30, 2009.

Google, Inc., "Personalized Search Review Guide," [online]. Retrieved from the Internet: http://static.googleusercontent.com/external_content/untrusted_dlcp/www.google.com/en/us/intl/gn/press/guides/personalized_overview.pdf , 4 pages.

Google, Inc., "Personalized Homepage Reviewer's Guide," [online]. Retrieved from the Internet: http://static.googleusercontent.com/external_content/untrusted_dlcp/www.google.com/en/us/intl/en/press/guides/homepage_overview.pdf, 4 pages.

* cited by examiner

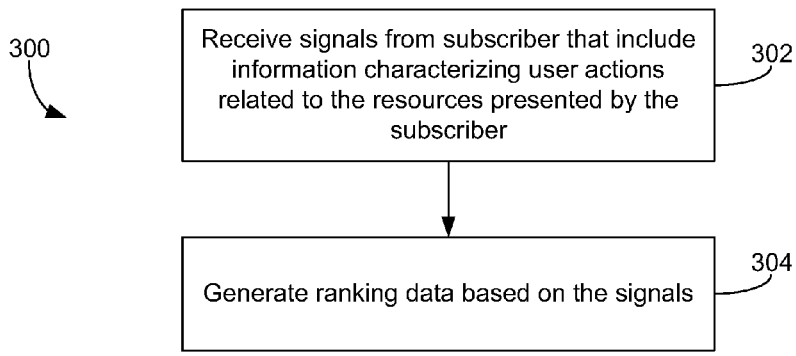
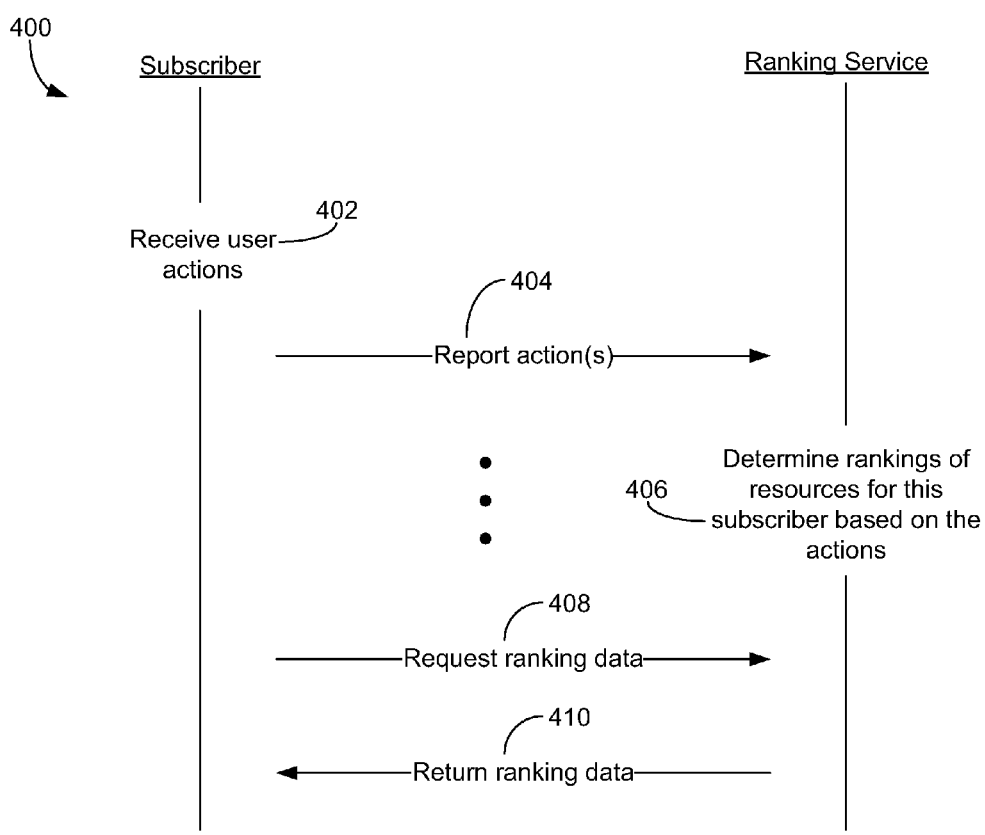

ONLINE RANKING METRIC

RELATED APPLICATIONS

This application claims the benefit under 35 U.S.C. §119 (e) of U.S. Patent Application No. 60/862,003, titled "RANKING AND RECOMMENDATION SERVER FOR BROWSABLE DIRECTORIES," filed Oct. 18, 2006, which is incorporated by reference herein in its entirety:

This application is related to the following applications, which are incorporated by reference herein in their entirety:

U.S. patent application Ser. No. 11/874,888, titled "Generic Online Ranking System and Method Suitable for Syndication," filed Oct. 18, 2007; and U.S. patent application Ser. No. 11/874,889, titled "Online Ranking Protocol," filed Oct. 18, 2007.

BACKGROUND

This specification relates generally to the ranking of digital resources.

"Browse-and-search" directories of content are proliferating on the World Wide Web. Examples include directories of 3D models for viewing in geographic information applications, directories of widget applications, and directories of visual content such as images or videos. These directories allow users to find the content in which they are interested through searching or through browsing by category.

The content in a browse-and-search directory can be ranked and presented in the directory based on the ranking order. By presenting the content in the ranking order, users viewing the directory can be presented with the "good" content first. Content providers have an incentive to provide content that are more likely to be ranked as "good," in order to increase the potential audience for their content. Many browse-and-search directories, however, do not have enough traffic or user activity to justify the cost of having dedicated computing resources for determining rankings or having ranking capabilities on par with the ranking capabilities implemented for web search or advertisements.

SUMMARY

In general, one aspect of the subject matter described in this specification can be embodied in methods that include the actions of, for each of a plurality of resources presented to a plurality of users by a data processing service: receiving one or more signals reporting one or more actions by the plurality of users related to the respective resource, where a reported action is a presentation of the respective resource, an addition of the respective resource, or a deletion of the respective resource, the reported actions include one or more short deletions of the respective resource, a short deletion of the respective resource being a deletion of the respective resource occurring within a predefined time period after a corresponding addition of the respective resource, and determining a respective long-addition click-through rate (LACTR) for the respective resource based on a number of reported presentations of the respective resource and a difference between a number of reported additions of the respective resource and a number of short deletions of the respective resource; ranking the plurality of resources based on the respective LACTRs for the plurality of resources; and providing the ranking of the plurality of resources. Other implementations of this aspect include corresponding systems, apparatus, and computer program products.

Particular embodiments of the subject matter described in this specification can be implemented to realize one or more of the following advantages. A ranking service can be syndicated to multiple subscribers. The ranking service and the subscribers exchange data using a predefined protocol. The ranking service can be a generic service that is not competitive with ranking capabilities for web search. The ranking service scores and ranks the resources of a subscriber using user action data that is reported by the subscriber. The resources of a subscriber can be scored and ranked by context. A subscriber can define the contexts for which rankings of the resources of the subscriber are to be generated.

BRIEF DESCRIPTION OF THE DRAWINGS

FIG. 3 is a flow diagram of an example process for ranking resources.

FIG. 4 is a diagram illustrating an example exchange of data between a ranking service and a subscriber.

Like reference numbers and designations in the various drawings indicate like elements.

DETAILED DESCRIPTION

Figure 1:
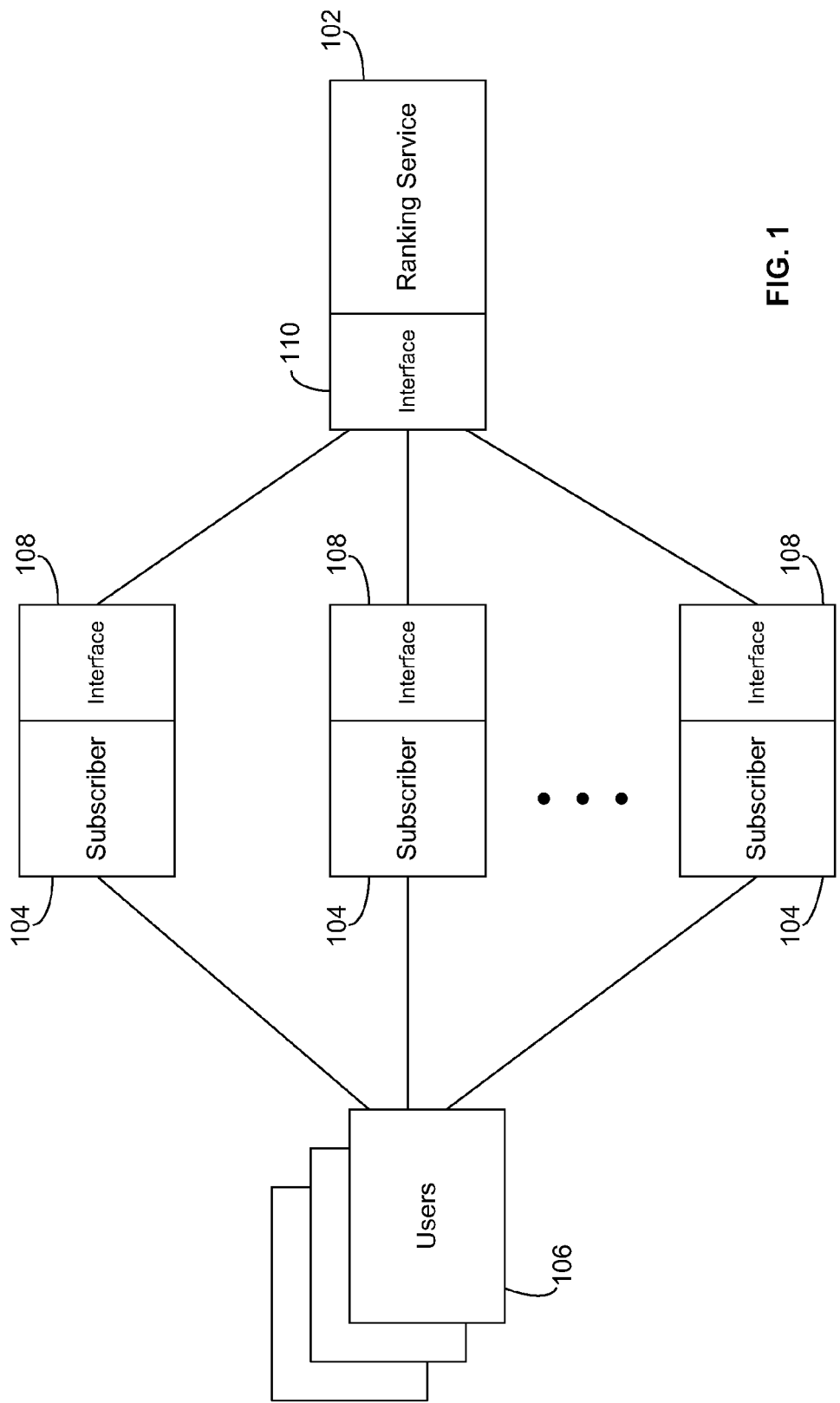
FIG. 1 is a block diagram illustrating a ranking service and one or more subscribers.

FIG. 1 is a block diagram illustrating a ranking service 102 and one or more subscribers 104. The ranking service 102 provides ranking services to the subscribers 104, as will be described. The ranking service may be implemented on a computer system made up of one or more computers, which may be in a single location or geographically distributed. Users 106, using client computers or other client devices, may access any of the subscribers 104. Users may be people or computer programs running in a computer system or a device.

Each of the subscribers 104 to the ranking services is a data processing service or system. Examples of data processing services or systems include, without limitation, a personalized homepage service, a shopping website, a content sharing or distribution website or service, or a software download website or service. A subscriber 104 presents one or more resources to users who access the subscriber, either by making the resources available directly to users or by presenting links to the resources. A resource, as used in this specification, is digital data that has an identity and, in general, is retrievable from a repository or service using the identity or through some data processing operations. A resource can include other resources. Examples of resources include, without limitation, data representations of real items for sale on a shopping website; software or data files; images, videos or audio clips; or widgets, gadgets, or modules in a personalized homepage service. A subscriber 104 can present its resources to users in an application. For example, the resources may be presented in a webpage rendered in a web browser application.

Users 106 can access a subscriber 104 and interact with the subscriber 104 and/or with the resources provided by the subscriber 104. For example, a user can access a shopping website and view data representations of items sold by the shopping website and place orders for the items. As another example, a user may access a personalized homepage service, view available widgets, gadgets, or modules that can be added to a personal homepage, and add any number of the available widgets, gadgets, or modules to the personal homepage. In some implementations, the resources of a subscriber are presented to the users as a directory of resources (a "browsable directory") through which the users can browse and search. The top level of the browsable directory includes the totality of the resources that the subscriber makes available. The resources can be organized into categories and sub-categories, which are placed as sub-levels of the top-level browsable directory.

Users 106 may access a subscriber 104 from any of a variety of client computers or devices, e.g., desktop computers, notebook computers, tablet computers, network terminals, personal digital assistants (PDAs), mobile phones, smartphones, music or multimedia player devices, and so forth.

A ranking service 102 provides ranking services to subscribers 104. In providing ranking services, the ranking service 102 receives signals from the subscriber, identifies from the received signals user actions related to resources presented by the subscriber, and scores the resources based on the identified user actions. The resources are ranked based on the scores and the ranking is provided to the subscriber or, optionally, to another requester (which may be another data processing service), on request. Optionally, the ranking service also provides the scores. The ranking service 102 can provide ranking services to multiple subscribers.

In some implementations, the ranking service 102 keeps the information reported in the signals indefinitely, allowing the ranking service 102 to build long-term user action histories of users and resources.

The ranking service 102 can provide a ranking for a subscriber's resources with respect to all of a subscriber's resources as a whole or, optionally, with respect to a subscriber-defined subset of the subscriber's resources. Subsets can be based in whole or in part on one or more of geographic boundaries, political boundaries, demographic information, time, language, industry, or access rights. The ranking service 102 can optionally also provide rankings with respect to a particular user. For example, a requester may request a ranking that takes into account a user profile or a user action history of a user.

The score of a resource is a value that is a function of the user activity related to the resource. A ranking is an ordered representation of resources that indicates an order determined by their respective scores.

The ranking service 102 and the subscribers 104 communicate through interfaces 108 and 110. The communication between the ranking service 102 and the subscribers 104 through the interfaces 108 and 110 include the sending and receiving of data using one or more predefined protocols. That is, the ranking service 102 uses the same protocol to send data to and receive data from multiple subscribers, and each subscriber uses the same protocol to send data to and receive data from the ranking service 102. In some implementations, different classes of subscribers are offered different protocols suitable for their particular requirements.

The ranking service 102 generates its scores and rankings of resources for each subscriber based on data provided by the subscriber. The ranking service 102 can accept the data provided by a subscriber as is (assuming that the data is sent in accordance with the protocol) and does not attempt to acquire, for ranking purposes, data beyond what is provided by the subscriber. For this reason, the ranking service 102 can accept data from a subscriber that may have significance to the subscriber but has no a priori significance to the ranking service.

Nevertheless, the ranking service can detect correlations in such data and use the correlations in determining rankings.

In some implementations, the architecture of the ranking service 102 and the subscribers 104 are implemented in accordance with the representational state transfer (REST) software architectural style.

Ranking Data Protocol

The ranking service and subscribers may send and receive data using a specific protocol (generically, the "ranking data protocol," for convenience) that specifies the form and the significance of data sent between a ranking service and a subscriber. The protocol may be publicized by the ranking service in any suitable manner, e.g., publication in a website, e.g., in the form of a WSDL (Web Services Description Language) document. Any subscriber may use the protocol.

The ranking data protocol also specifies how user actions are reported. The ranking data protocol specifies that a signal reporting a user action identifies the user action and identifies a resource to which the user action relates. In some implementations, the ranking data protocol specifies that user actions are reported as one of three types: views, additions, and deletions.

A subscriber would report an action as a view of a resource when the subscriber has presented or displayed the resource to the user. In an exemplary personalized homepage implementation, a view may be any action in which a resource is displayed to a user. Whether the resource is displayed to a user in response to a search by a user or as a result of browsing for resources by the user, the action of displaying may be counted as a view. In an online store implementation, the displaying of information associated with a product to a user may be reported as a view of a resource (the resource being the data representation of the product, including the information associated with the product). Similarly, for a software download website implementation, the displaying of information associated with a software download may be reported as a view of a resource, namely a view of the software and related information.

A subscriber would report an action as an addition of a resource when the subscriber has received information that a resource has been affirmatively accepted by a user. In the example personalized homepage implementation, an addition action would be reported when a user adds a resource to the user's personalized homepage. In the example shopping website implementation, an addition of a resource, i.e., an item sold by the shopping website, would be reported when a purchase of the item occurs. In the example software download website implementation, an addition of a resource, i.e., a piece of software available for download from the website, would be reported when a download of the piece of software by the user to a client machine occurs.

A subscriber would report an action as a deletion of a resource when the subscriber has received information that a resource has been affirmatively rejected by a user after an addition of the resource by the user. In the example personalized homepage implementation, a deletion action would be reported when a user deletes from a personalized homepage a resource the user had previously added to the homepage.

Generally, each individual subscriber decides what is and what is not a view, addition, or deletion. That is, each subscriber has its own definition of what actions are reported as a view, as an addition, or as a deletion to the ranking service.

In some implementations, the types of reportable actions in the ranking data protocol go beyond views, additions, and deletions. Inaction or idleness related to a resource can also be reported. For example, if a resource has not been added by any user during some period of time, this lack of usage activity for a resource may be reported to the ranking service. The ranking service may take this lack of usage activity into account when scoring the resource.

In the implementations where the user actions are reported as views, additions, and deletions, the score of a resource may be calculated based on the views, additions, and deletions related to the particular resource. In some implementations, the manner in which the score of a resource is calculated is predefined. In some other implementations, various scoring functions may be made available. The subscriber or requester may specify which function to use. If a scoring function is not specified by the subscriber or requester, the ranking service may use a default scoring function. For example, one subscriber may want its resources scored and ranked based only on views, while another subscriber may want its resources scored and ranked based on views and additions.

In some implementations, a score for the resource is calculated based on so-called "long additions." A "long addition" is an addition of the resource by the user, followed by a deletion of the resource by the same user more than a predefined time period after the addition or followed by no deletion of the resource by the same user. In some implementations, the number long additions for a resource is calculated as follows:

number of long additions for a resource=number of additions for the resource−number of short deletions for the resource, where a short deletion is a deletion of the resource by a user within the predefined time period after the addition of the resource by the user. In some implementations, the predefined time period for a deletion to be considered as a short deletion differs depending on the type of resource. For example, the predefined time period for a video may be 10 seconds, but may be 1 hour for a widget or gadget in a personalized home page service. In some implementations, whether a deletion is a short deletion or otherwise is up to the subscriber to determine and report to the ranking service.

In some implementations, a long addition can be defined by a subscriber in other ways depending on the type of resource. For example, for a video, a long addition can be defined as an instance of completion (or near-completion) of playback of the video for its entire duration.

The score for the resource can be the number of long additions for the resource, some function of the number of long additions for the resource, or some function of the number of long additions for the resource and of other values, e.g., the number of views for the resource. An example of a scoring function that uses the number of long additions is described below in reference to FIGS. 6-7. In some implementations, a decay function can be applied to the counts of the actions. For example, the number of views for a resource can decay linearly or otherwise over time. The decay can have the effect of deemphasizing the influence of actions that occurred a relatively long time ago on the rankings.

In some implementations, the signals reporting user actions also include indications of the times at which the reported actions occurred. For example, the subscriber can report additions and deletions, with their respective times. The times can be used to determine if a deletion is a short deletion. In some implementations, the signals report specifically whether a deletion is a short deletion; in such implementations, the subscriber determines whether a deletion is a short deletion and reports short deletions as such.

The ranking data protocol need not specify a naming convention or a namespace for resources. A subscriber can define its own naming convention and/or namespace for its resources. The naming convention or namespace defined by a subscriber may use arbitrary names for resources. The resource names defined by a subscriber have no a priori significance to the ranking service. The naming convention or namespace defined by the subscriber may include the use of pseudonyms, code names, or the like. The ranking service associates user actions related to a resource with whatever name is provided for that resource by the subscriber. When the ranking service provides scores or rankings to a requester and includes names of resources in the scores or rankings, the included names are the pseudonyms, code names, or whatever names that are provided by the subscriber. Identification of the resources corresponding to the pseudonyms or coded names is left to the subscriber or requester. The protocol optionally includes an optional parameter with which a subscriber can identify a namespace for its resources.

For some subscribers, names for resources may be relatively long. For example, Universal Resource Locators (URLs) of resources may be used as resource names. The URL for a resource may include various parameters and as a result become relatively long. In some implementations, rather than sending the full URL for a resource as the name of the resource, a subscriber generates a shorter name for the resource by, for example, encoding the URL of the resource and then generating a hash of the encoding. Other encoding or name mapping schemes may be used. The shorter, encoded name can then be used in signals reporting user actions. The shorter, encoded name can be used to provide anonymity for the resources and/or to optimize performance by reducing the amount of data transmitted and processed.

The signals can include one or more parameters and values for these parameters. Such parameters can be used to qualify the user actions reported in the signals and give the user actions context. The contexts may be used to generate finer rankings for resources or to generate normalized rankings. For example, if the resources are modules for personalized homepages and the modules are made available to personalized homepages in various languages, the modules may have a score and/or ranking for each of the various languages, as well as an overall score/ranking. A signal reporting a user action related to any of the modules will include a parameter indicating the language context in which the user action occurred.

Signals from a subscriber may include an identifier of the subscriber sending the signals. A subscriber may use an arbitrary string to identify itself in its signals. To ensure that subscriber names are unique, the ranking service may append additional characters to subscriber names. In some implementations, the subscriber may also identify a subdivision of the subscriber with which the user action is associated. For example, in an example module service subscriber that provides modules for addition to personalized homepages and desktop search application environments, the module service subscriber may identify whether a module was added to or deleted from a personalized homepage or a desktop search application environment. A ranking service may generate rankings with respect to particular subdivisions of a subscriber.

In some implementations, the ranking service does not require that a subscriber register with the ranking service before the subscriber sends data to the ranking service. In some other implementations, the subscriber is required to register by providing information identifying the subscriber, for example, and receiving a subscriber identifier and optionally a password or cookie. The ranking service may enforce uniqueness of subscriber identifiers at the pre-registration stage by requiring selection of a unique subscriber identifier during registration.

Signals from a subscriber may include, for a reported user action, an identifier of the user who initiated or performed the action. The naming convention for users is left to each subscriber. By including the user identifier in the signal, the ranking service receiving the signal can identify resources that the user has viewed or added, and group this user with other users who have viewed or added similar resources.

The parameters and values included in signals may include parameters and values defined by the ranking service and parameters and values defined by the subscriber sending the signals. The ranking service may define parameters that any subscriber can use in its signals. The parameters defined by the ranking service would be those the services considers to be of general significance for subscribers. The parameters and values defined by a ranking service may be defined as part of the ranking data protocol for the ranking service.

In some implementations, the parameters defined by the ranking service as part of the ranking data protocol include language, geographic region, and category. A language parameter and corresponding values indicate the language context in which a user action relating to a resource occurred. The language context may refer to the language of the resource itself or the language of the environment in which the action related the resource occurred. For example, if the user added a French-language module to a personalized homepage, the action (the addition) may be reported as having taken place in a context where the language is French. As another example, a module may be added to an English-language personalized homepage and a German-language personalized homepage. The signal reporting the addition to the English homepage may include a value specifying "English" for the language parameter, and the signal reporting the addition to the German homepage may include a value specifying "German" for the language parameter. In some implementations, a signal may include a value for the language parameter in the format "lang=value," where the value indicates the language. Values for the language parameter may be specified using well-known language codes, e.g., the ISO (International Organization for Standardization) 639 set of language codes.

A geographic region or locale parameter may also be defined to give context to user actions. The region parameter indicates the location of the user or the location of the action. For example, if a user action is determined to have taken place in Canada (e.g., because the action was performed at a subscriber in the ".ca" country code top-level domain), the signal reporting the action may include a value specifying "Canada" for the region or locale parameter. In some implementations, "geographic region" or "locale" are countries or nations. Values for the geographic region or locale parameter may be specified using well-known country codes, e.g., ISO 3166 country codes.

A topical category parameter may also be defined by the ranking service. Examples of topical categories include sports, politics, technology, lifestyle, and entertainment. Subcategories may also be defined within categories.

Parameters for a user identifier and a subscriber identifier may also be defined by the ranking service. For these parameters, the value spaces for these parameters may be defined by the individual subscriber.

In some implementations, the ranking service, when calculating scores and rankings, may take into account whether a resource was presented at the top or bottom of a page and/or whether the resource was presented in the first page or a subsequent page within multiple pages of resources. A parameter for specifying the position in which, or, more generally, the prominence with which, a resource was presented may be defined by the ranking service for use by subscribers.

A subscriber may also define one or more parameters and corresponding values. Subscriber-defined parameters and corresponding values will presumably be significant to the defining subscriber but will not necessarily have any meaning to other subscribers or to the ranking service. As with names for resources, the ranking service attributes no a priori significance to subscriber-defined parameters and accepts subscriber-defined parameters and values as they are provided by the subscriber. Indeed, two subscribers may use the same text string to specify respective parameters and the ranking service will treat the parameters as unrelated to each other because they are associated with different subscribers.

Examples of subscriber-defined parameters could include, for example, clothing size defined by a subscriber that is a shopping website, or license type (freeware, shareware, and so on) for a subscriber that is a software download website.

In some implementations, a signal need not include values for all of the parameters defined by the ranking service or all of the subscriber-defined parameters. The ranking service associates an action reported in the signal with whatever context parameter values are specified. If a signal reporting an action does not specify any context parameter values, the action reported in the signal may be associated with a default set of context parameter values.

In some implementations, a signal can be an aggregated signal reporting actions for multiple resources. For example, a signal may report that resources A, B, C, and D were viewed by the same user. The number of resources for which actions are reported in a signal or the number of actions reported in the signal may be capped. For example, a signal may report actions for up to a predefined number of resources.

The ranking data protocol also defines how rankings (and optionally, scores) are requested and reported. In some implementations, a request for rankings or scores includes an identifier of the subscriber associated with the resources for which rankings or listings are requested, optional context parameters such as language, category or subscriber-defined parameters, and optional values, if supported by the ranking service, indicating how many resources to include in the rankings and which resources to include. The identifier of the subscriber identifies the subscriber associated with the resources for which scores or rankings are requested. For example, if a personalized homepage service is requesting rankings for its resources, the homepage service would identify itself in the request and optionally one or more pertinent subdivisions of the homepage service. The request may include one or more context parameters; the context parameters indicate for which context are rankings being requested. For example, a request specifying that the language context is English and the geographic region context is the United States may be understood as a request for rankings with respect to an English-United States context. Context parameters may include the parameters defined by the ranking service, e.g., language, geographic region, and category, as well as any subscriber-defined parameters.

In some implementations, a request can indicate how many resources to return, a starting offset, or both. For example, a request may indicate that 30 resources, starting from the 11th highest ranked resource, be returned. This can be used for displaying the ranked resources to a user over multiple pages. For example, if 10 resources can be displayed per page, the first 10 ranked resources can be requested for display in the first page, the second 10 ranked resources can be requested for display in the second page, and so on.

The ranking service may report the rankings as a listing of resources listed in their ranking order. The reported rankings identify the resources using the resource names as provided by the subscriber.

The ranking data protocol may be implemented using any of a variety of technologies for exchanging data or messages, including but not limited to Simple Object Access Protocol (SOAP), Extensible Markup Language (XML), Hypertext Transport Protocol (HTTP), and HTTP+XML. For example, the signals can be transmitted from a subscriber using XML or HTTP POST methods.

In some implementations, data is exchanged between the ranking service and a subscriber in Uniform Resource Locators (URL) or in Uniform Resource Identifiers (URI) sent in HTTP messages. That is, the signals, rankings requests, and reported rankings are all strings embedded in URLs or URIs. For example, a signal URL reporting actions might look like:
http://www.rankingserver.com/idofsubscriber/
roa?action=v&subs=nameofsubscriber&ob js=aZ,t,f,
g2D,31R,42,N3rD
where "roa" stands for "report of actions" and "roa?" indicates that this is a signal reporting user actions. The "action" parameter indicates the action being reported (here, "v" for view). The "subs" parameter is a name of the subscriber. The "objs" parameter is a list of resources affected by the action (viewed, added, deleted, and so on). Thus, the example signal URL above reports views of resources "aZ," "t," "f" "g2D," "31R," "42," and "N3rD."

A signal URL that reports an addition might look like this:
http://www.rankingserver.com/idofsubscriber/
roa?action=a&subs=nameofsubscriber&ch
anged=g2D&objs=aZ,t,f,g2D,31R,42,N3rD
where the value "a" for the "action" parameter indicates an addition being reported, and the value "g2D" for the "changed" parameter identifies the added resource. Thus, this sample URL reports an addition of resource "g2D" and views of views of resources "aZ," "t," "f," "g2D," "31R," "42," and "N3rD." Other parameters may be included in the URL as appropriate.

A request URL requesting rankings may look like this:
http://www.rankingserver.com/idofsubscriber/
objs?req=blogger&num=10&start=10
In this example, "objs?" indicates that this URL is a request for rankings. The "req" parameter is a name of the requester. The num parameter indicates how many items to return. In some implementations, the entire result set of ranked resource is downloaded if num=0. The start parameter indicates a starting offset in the set of ranked resources. For example, a request for num=10 and start=1 requests that the 10 highest ranked resources (10 resources starting from the first highest ranked) be returned. A request for num=10 and start=11 requests the next 10 highest ranked resources (10 resources starting from the eleventh highest ranked).

In some implementations, the ranked resources reported by the ranking service are reported as text strings of their names, listed in their ranking order, with optional separator characters between each name string.

Figure 2:
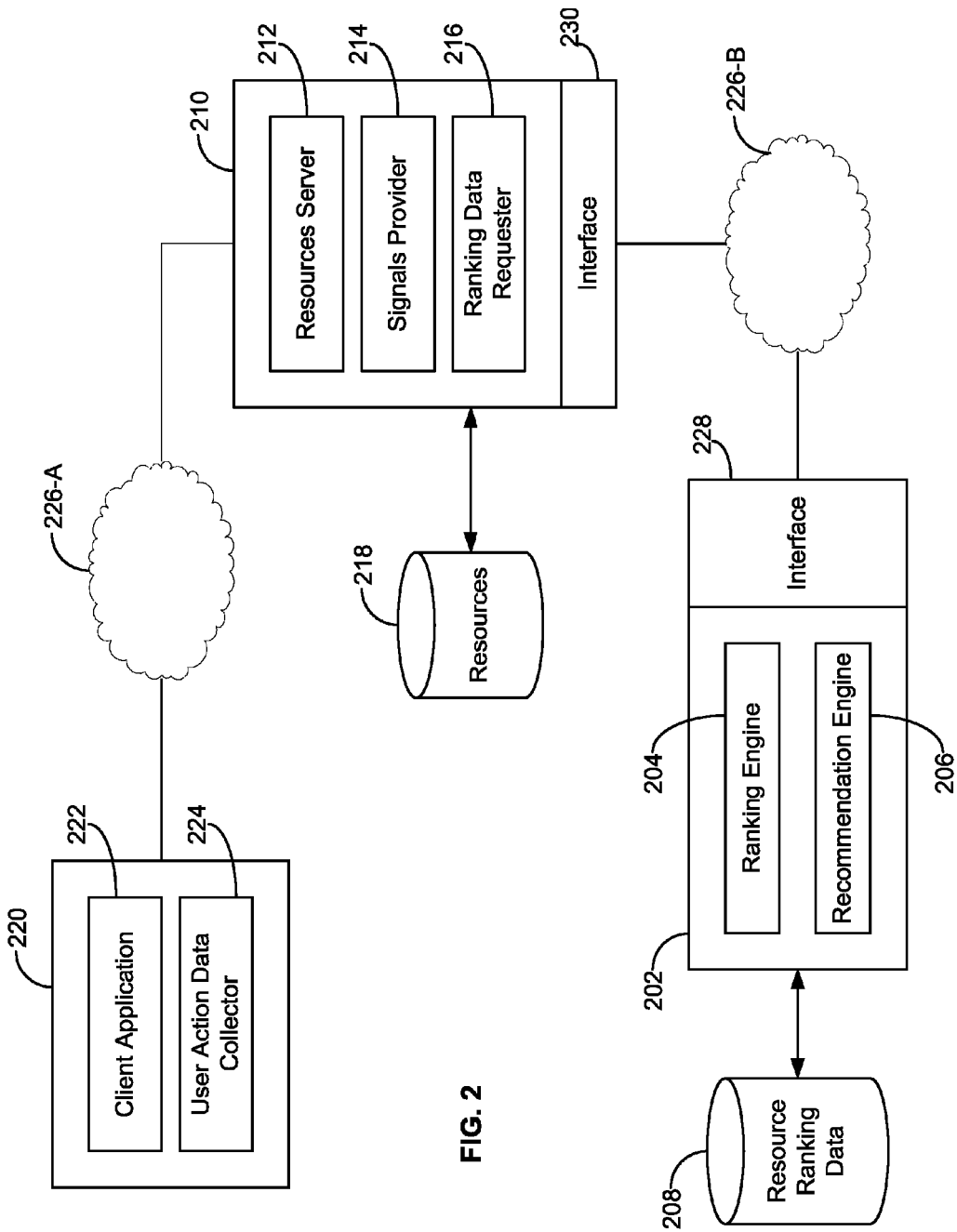
FIG. 2 is a block diagram of a ranking server, a subscriber server, and a client device.

FIG. 2 is a block diagram of a ranking server 202, a subscriber server 210, and a client device 220. The ranking server 202 includes a ranking engine 204 and a recommendation engine 206. The ranking server 202 also includes resource ranking data 208, which includes data from signals sent by subscriber server 210 and ranking data generated by the ranking server 202. The data from the signals may be kept indefinitely (i.e., not deleted even when the data has aged beyond a certain amount) or not. In some implementations, the resource ranking data 208 may be stored in a database.

The ranking engine 204 generates scores and rankings for resources provided by subscribers. The recommendation engine 206 receives requests for rankings. The recommendation engine 206 provides rankings in response to the requests. In some implementations, the recommendation engine 206 may provide rankings that take into account information regarding a particular user.

The subscriber server 210 includes a resources server 212, a signals provider 214, a ranking data requester 216, and resources 218. The resources server 212 serves resources 218 to client devices 220. The signals provider 214 gathers user action data and sends the user action data to the ranking server 202. The ranking data requester 216 sends requests for rankings from the ranking server 202.

The ranking server 202 and the subscriber server 210 include an interface 228 and 230, respectively. The ranking server 202 and the subscriber server 210 send and receive data through the respective interfaces. In some implementations, interfaces 228 and 230 implement a protocol that defines the format for communications between the ranking server 202 and subscriber server 210.

The client computer 202 includes a client application 222 and a user action data collector 224. A user may access a subscriber through a client application 222. In some implementations, a user accesses the subscriber through a web-based interface, and the client application is a web browser that, among other things, renders and displays the web-based interface. A user action data collector 224 monitors user actions related to resources presented by subscribers, and forwards data characterizing the user actions to the pertinent subscriber.

In some implementations, a user action data collector 224 may be specific to a particular subscriber, in which case, the user action data collector 224 collects user action data for only that subscriber. In some other implementation, a user action data collector 224 may collect user action data for multiple subscribers. In some implementations, the user action data collector 224 is a JavaScript module embedded in the web-based interface of a subscriber. When a client device 220 accesses the web-based interface, the JavaScript module may be downloaded to the client device 220 and activated when the web-based interface is rendered by the client application 222. In some other implementations, the user action data collector 224 may be a standalone application, a module within a standalone application, or a module within an add-on or plug-in application. For example, the user action data collector 224 may be a module in a toolbar add-on to a web browser application. A client device may include multiple user action data collectors.

In some other implementations, a user action data collector 224 may send the user action data to a user action database. The signals provider 214 may access the user action database and retrieve the data for sending to the ranking server 202.

In some implementations, the collection of user action data takes place at the client device 220 and at the subscriber server 210. User actions are monitored at the client device 220 and data regarding user actions are sent from the client device 220 to the subscriber server 210 for aggregation. In some other implementations, the collection of user action data takes place entirely at the subscriber server 210. The subscriber server 210 (e.g., the signals provider 214) may, in the normal course of processing inputs from clients devices 220, monitor and collect the user action data associated with user actions related to the resources. The one or more networks 226-A or 226-B may include local area networks, wide area networks, wired or wireless networks, and the Internet. In some implementations, the networks 226-A and 226-B are the same (e.g., the Internet).

FIG. 3 is a flow diagram of a process of ranking resources. While process flow 300 illustrates the process with respect to one subscriber, the process flow 300 is applicable to each of multiple other subscribers as well.

Signals are received from a subscriber (302). The signals from the subscriber include information characterizing user actions related to resources presented by the subscriber. The signals also include values for one or more predefined parameters and values for one or more subscriber-defined parameters. The subscriber-defined parameters are specific to the subscriber. In some implementations, the signals also include identifiers of the users who performed the user actions reported in the signals.

A ranking service may receive signals from multiple subscribers. Signals received from a first subscriber include information characterizing user actions related to individual ones of first resources presented by the first subscriber. Signals received from a second subscriber include information characterizing user actions related to individual ones of the second resources presented by the second subscriber. The signals received from the first subscriber may also include values for one or more parameters that are defined by the ranking service and values for one or more parameters defined by and specific to the first subscriber. The signals received from the second subscriber may also include values for one or more parameters that are predefined by the ranking service and values for one or more parameters defined by the second subscriber and specific to the second subscriber.

Ranking data are generated from the signals (304). Ranking data, which ranks the resources, are generated from the received signals, values in the signals for parameters specific to the subscriber, and values in the signals for predefined parameters. Ranking data for the subscriber, however, are not generated based on values for parameters specific to other subscribers. For example, ranking data for resources presented by the first subscriber may be generated from the first signals, values in the signals for parameters defined by the ranking service, and values in the signals for parameters defined by the first subscriber, but not from values for parameters defined by any other subscriber. Similarly, ranking data for resources presented by the second subscriber may be generated from the second signals, values in the signals for parameters defined by the ranking service, and values in the signals for parameters defined by the second subscriber, but not from values for parameters defined by any other subscriber.

Generation of ranking data includes scoring resources and ranking the resources based on the scores. Example ranking functions are described below in reference to FIGS. 6-7.

Optionally, the ranking service supports a plug-in ranking algorithm, which enables a syndicator to provide its own ranking function based on the signals and implemented in agreed-upon language, e.g., Perl, Python, or the like. In some implementations, the ranking function is provided as an optional parameter with the request to return the ranked resources, e.g., &rank_func=<url to the code for ranking>. The first such request may be computationally expensive because existing resources may all have to be re-ranked. On subsequent requests with the same ranking function, however, the required computation would be significantly less because the ranking server can cache the ranking results. If the ranking server detects that a given &rank_func value is popular, the ranking server can prefetch this code and pre-compute the rankings to provide good response to an initial ranking request. In addition, the ranking server can disable the cache, e.g., to enable testing new functions; and the ranking server can delete cached rankings if it runs out of storage space. In some implementations, the subscriber can specify a requested amount of time to keep the cached data.

In some implementations, the ranking of resources is query-independent. That is, the ranking function does not take into account a query for resources that a user may have submitted to a subscriber. In such implementations, a resource is ranked based on its user action activity, and the relevance of a resource to a query is of no consequence. In some other implementations, the ranking of resources is query-dependent. That is, the ranking function takes into account a query for resources that a user submits. The query with respect to which resources are to be ranked is provided to the ranking service by the subscriber, as an additional parameter, for example. In such implementations, a resource is ranked based on some measure of relevance to the query or a combination of relevance to the query and user action activity. For example, a resource that satisfies a query is ranked higher than a resource that does not satisfy the query, all else being equal. In some implementations, a subscriber can specify whether it wants a query-independent or a query-dependent ranking. If the subscriber specifies its own ranking function, it can specify a query-independent or a query-dependent ranking function.

FIG. 4 is a diagram illustrating an exchange of data between a ranking service and a subscriber. The data exchange 400 illustrates the data communications between a subscriber and the ranking service.

The subscriber receives user actions related to resources presented by the subscriber (402). The subscriber reports the user actions to the ranking service (404). The user actions may be reported in the signals described above. In some implementations, signals may be sent periodically by the subscriber to the ranking service. In some other implementations, signals may be sent as the user actions are received by the subscriber or at other rates.

The ranking service generates rankings of resources for this subscriber based on the actions (406). The rankings are generated based on the actions as reported by the subscriber (e.g., in signals sent by the subscriber). In some implementations, rankings are generated periodically. In some other implementations, rankings are also generated in response to requests for rankings. That is, when a ranking request is received, the rankings that are responsive to the request are re-generated so that the rankings sent in response to the request are fresh.

The subscriber (or another requester) may request ranking data from the ranking service (408). The ranking service returns ranking data to the requesting subscriber or requester (410).

The rankings includes a list of resources in their ranking order. When the subscriber presents the resources included in the rankings to a user, the subscriber may display the resources in the ranking order or in some other order. Furthermore, if the rankings were requested by the subscriber in connection with a search for resources, any resources in the reported rankings that do not match the search criteria may be omitted by the subscriber from the resources displayed in response to the search.

As described above, rankings for a resource are generated based on signals reporting user actions for the resource. If a resource has no reported action, a ranking cannot be generated for the resource. A subscriber can provide signals reporting fabricated user actions as seed data for its resource rankings. The ranking service can accept the seed data as they are and generate initial rankings for the relevant resources using the seed data.

In some implementations, the ranking service identifies some user actions reported by a subscriber as not trustworthy. For example, the subscriber can be the victim of attack, which can lead to the subscriber reporting a statistically unlikely burst of activity. The ranking service can identify these reported actions as suspicious and ignore them in the ranking.

When a user performs actions related to resources, a history of user actions accumulates in the ranking service. Based on that history, particular characteristics or contexts may be associated with the user. For example, a user may be associated with a group of users (or "recommendation group") associated with a context where the language is French and the region is Canada. The user is associated with the French-Canada recommendation group because the user has viewed and/or added resources that are popular among other users in the French-Canada recommendation group. That is, the user has viewed and/or added resources that are popular within the French-Canada context. When the user accesses a subscriber, the subscriber may, recognizing the user and determining that the user is associated with the French-Canada recommendation group, request for this user resource rankings with respect to the French-Canada context.

As described above, rankings of a resource with respect to various contexts may be generated. Such rankings are sub-rankings of an overall ranking for a resource, the overall ranking taking into account all contexts. It may be the case that there may not be sufficient user action activity for some contexts to generate sufficiently reliable rankings for such contexts. For example, the level of user action activity in a French-China context may be much less than the level of user action activity in the French-Canada or French-France contexts. In such circumstances, when a user is accessing a subscriber under the French-China context, the ranking service may "blend" contexts together.

In some implementations, the blending is done by, in effect, aggregating signals associated with multiple contexts when generating rankings. For example, if rankings for the French-China context are desired, the ranking service may take into account, when generating rankings, user actions from other contexts where the language is French. In some other implementations, the ranking service may generate and report rankings for a higher level (i.e., broader) context, e.g., as reporting the rankings for the French context when rankings for the French-China context are requested. In further implementations, the ranking service may drop certain contexts. For example, if a user action was reported to have been performed in the English-Estonia context, the ranking service may drop the Estonia region context.

The blending of contexts may occur when a blending condition is satisfied. In some implementations, the blending condition is when the level of user action activity in a particular context is below a minimum threshold.

In some implementations, blending may also occur across subscribers. Because the ranking service generally treats resources from different subscribers as unrelated, subscribers that wish to enable cross-blending need to use a common namespace for their resources and identify themselves as agreeing to have their data used to determine rankings for other subscribers. The ranking data protocol specifies how subscribers can identify themselves as willing to share data.

Figure 5A:
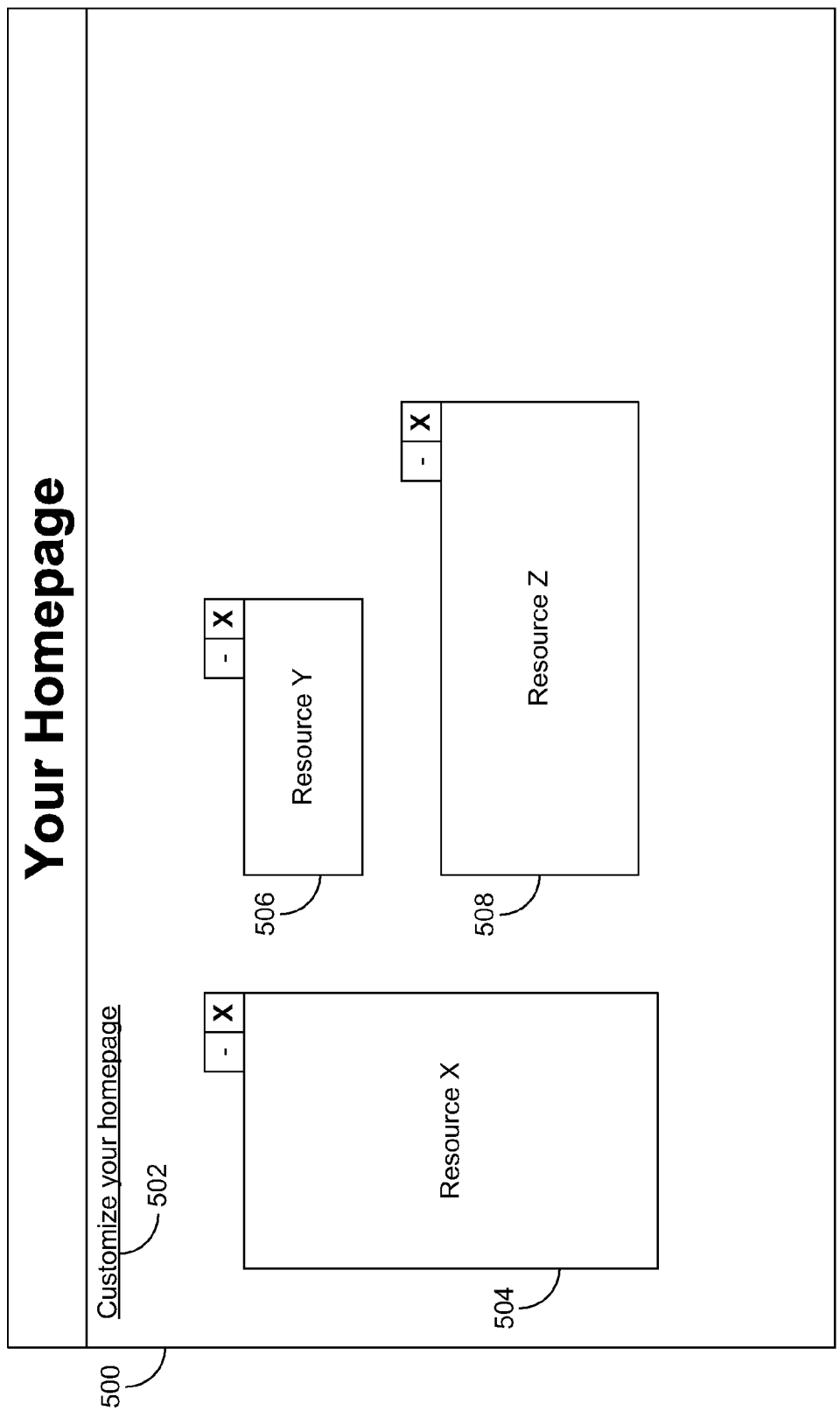
FIGS. 5A thru 5C illustrate an example user interface of an example personalized homepage.
Figure 5B:
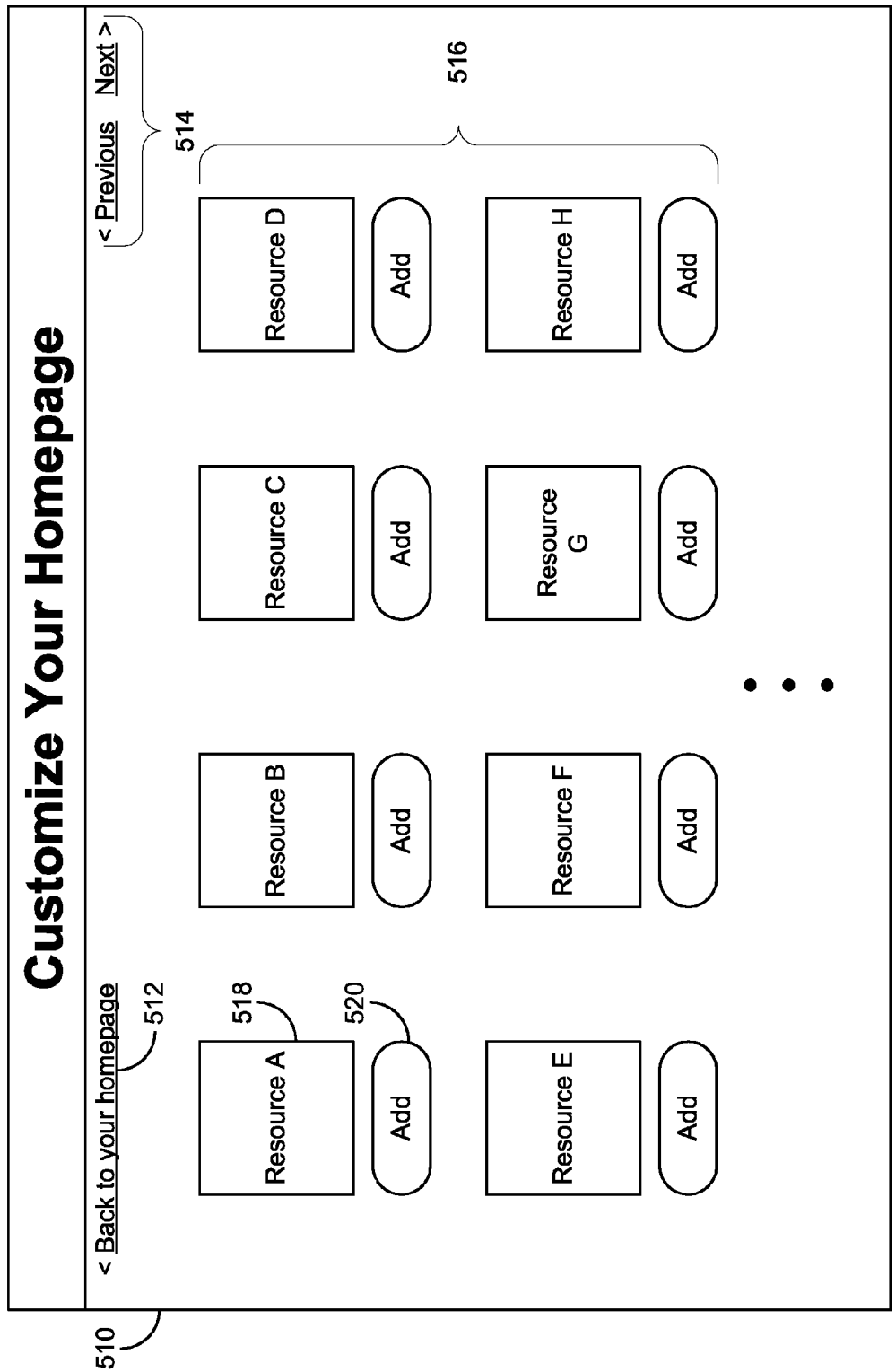
Figure 5C:
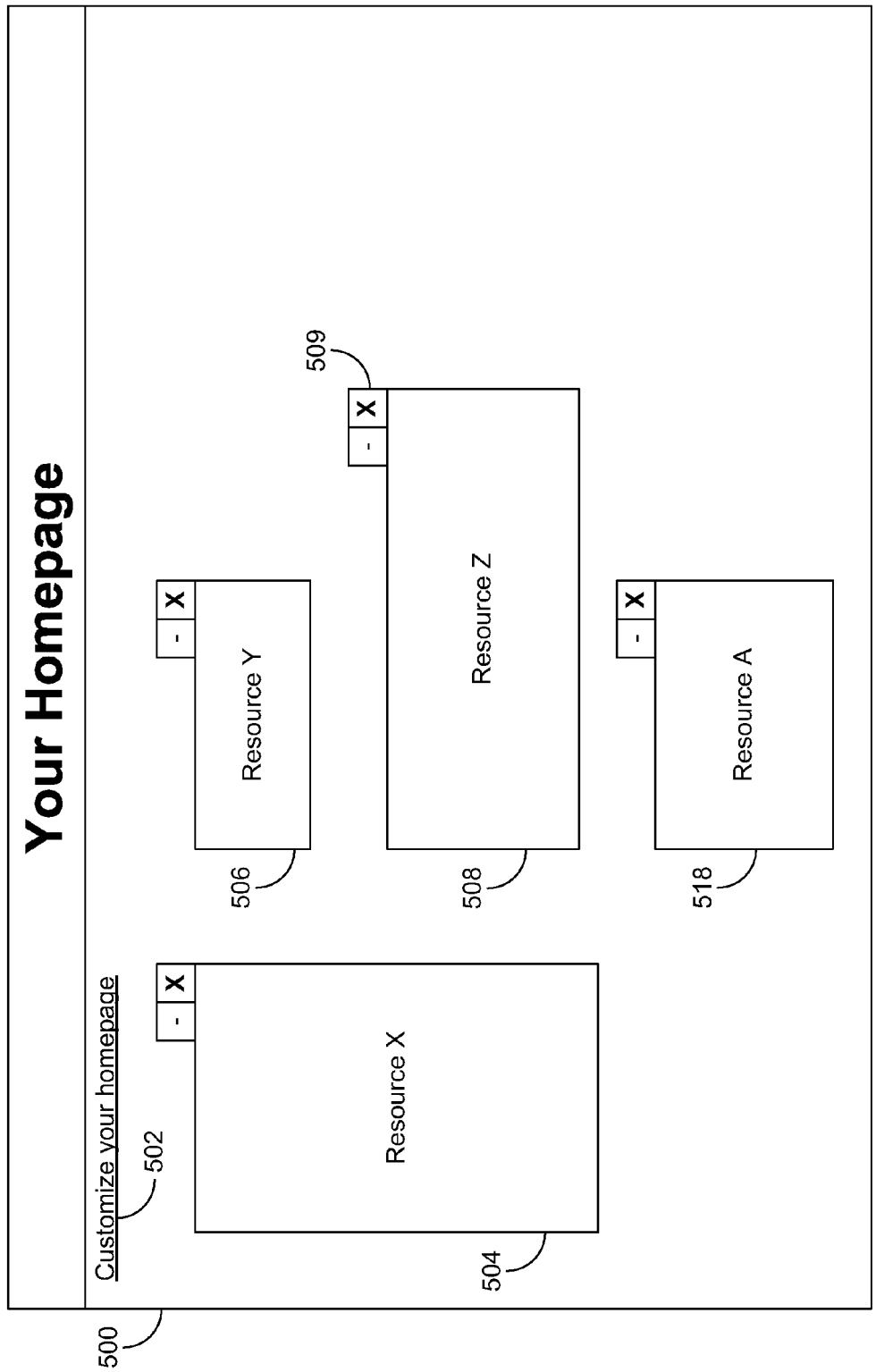

FIGS. 5A thru 5C illustrate an example user interface of an example personalized homepage. A personalized homepage service may provide personalized homepage spaces to users and resources for presentation in a personalized homepage space. A user may select the resources to be presented in the user's personalized homepage. In other words, the user has some control over what resources go into their personalized homepage.

In some implementations, resources that may be added to a personalized homepage include widgets, gadgets, or modules. Such resources perform particular tasks or display particular content. For example, a module may display a television schedule grid or a calendar. As another example, a module may display the content of a Really Simple Syndication (RSS) feed. In some implementation, such resources may be implemented as JavaScript modules that may be embedded in the personalized homepage. The resources are activated when the personalized homepage is rendered in a web browser application.

A personalized homepage 500 may include any number of resources (shown as resources 504-508 in FIG. 5A). The personalized homepage 500 may also include a link 502 or some other manner of navigating to a customization page 510, where the user may browse and/or search for resources to add to the personalized homepage.

The customization page 510 may include a link 512 back to the personalized homepage 500. The customization page 510 presents one or more available resources 516 or information about them. If the number of resources to be presented exceeds the display region capacity of the page, the customization page 510 may include "previous" and "next" links 514 for navigation between pages of resources. Each resource displayed in the customization page or pages that the user has navigated to may be reported by the personalized homepage service to the ranking service as viewed by the user.

The resources 516 may be displayed in the customization page 510 in an order that is based, at least in part, on the rankings of the respective resources 516 as reported by a ranking service. In some implementations, other considerations may affect the order in which the resources are displayed. For example, in some implementations, the top 30 resources may be presented in a randomized order, in order to reduce the effect of the bias towards higher-ranked resources that may occur when higher-ranked resources are always displayed first.

In some implementations, the customization page 510 allows a user to browse available resources or search for resources meeting specified criteria. The customization page 510 may include one or more search fields for searching for resources, or a link to a search page may be included in the customization page 510 for navigating to the search page. The search fields may allow for searching by keyword, author, date, category, or any other suitable criterion or combination of criteria.

As an example scenario, consider a user who wishes to add Resource A 518 to a personalized homepage 500. The user can select the "Add" button 520 in the customization page 510. Then, in the personalized homepage 500, Resource A 518 is presented along with resources 504-508. The personalized homepage service reports the adding of Resource A to the ranking service as an addition action related to Resource A.

The user can also delete a resource from the personalized homepage 500. For example, if the user wishes to delete Resource Z 508, the user may click on the "X" 509 right above the resource. After the user deletes Resource Z 508, Resource Z 508 is no longer displayed in the personalized homepage 500 until the user adds it back. The personalized homepage service reports the deletion of Resource Z to the ranking service as a deletion action related to Resource Z.

Figure 6:
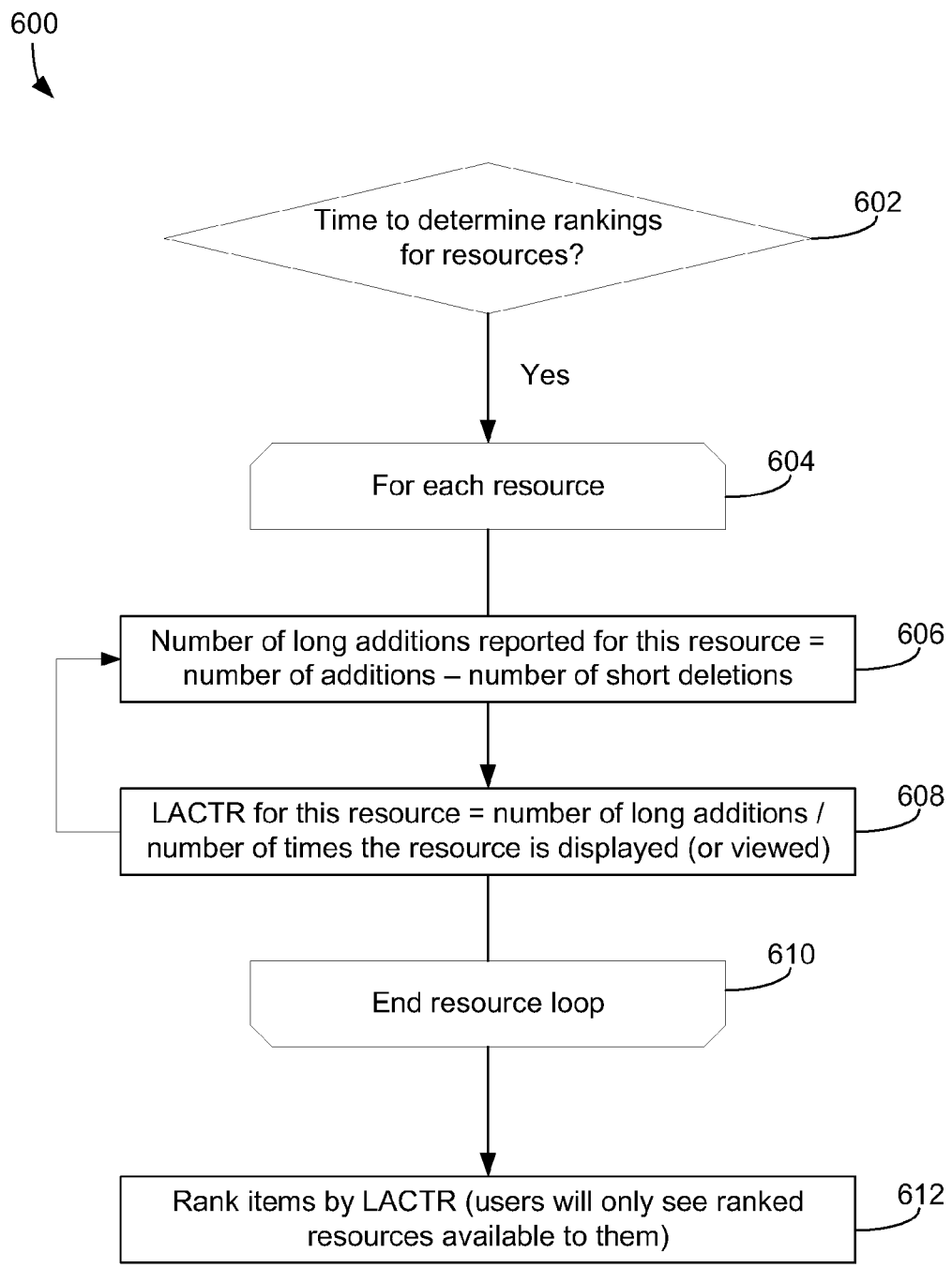
FIG. 6 is a flow diagram of an example process for determining rankings of resources.

FIG. 6 is a flow diagram of an example process 600 for determining rankings for resources. Resources are ranked periodically (e.g., daily or hourly). The resources are ranked by determining a long add click through rate (LACTR) for the resources. The LACTR of a resource is a score that is used to rank the resource.

When it is time to determine rankings for resources (602), a LACTR is calculated for each of the resources in accordance with the received signals reporting actions for the resources (604). A LACTR is calculated for each resource available to a user (606, 608). In this example, the calculations are performed in a loop (604, 610).

A number of long additions is calculated for a resource (606). The number of long additions is the number of additions for the resource minus the number of short deletions for the resource, as described above.

A LACTR is calculated for the resource (608). The LACTR for a resource is the number of long addition for the resource divided by the number of times the resources was displayed. In some implementations, the number of views for the resource is used as the number of times the resource was displayed.

The loop ends when a LACTR is calculated for each of the resources (610). The resources are ranked by their LACTRs (612), i.e., by ordering the resources according to their LACTRs. The higher the LACTR of a resource, the higher the resource is ranked. In some implementations, not all of the resources for which a LACTR was calculated is included in the rankings. For example, a resource may be omitted from the rankings if its LACTR does not meet or exceed a predefined threshold.

Figure 7:
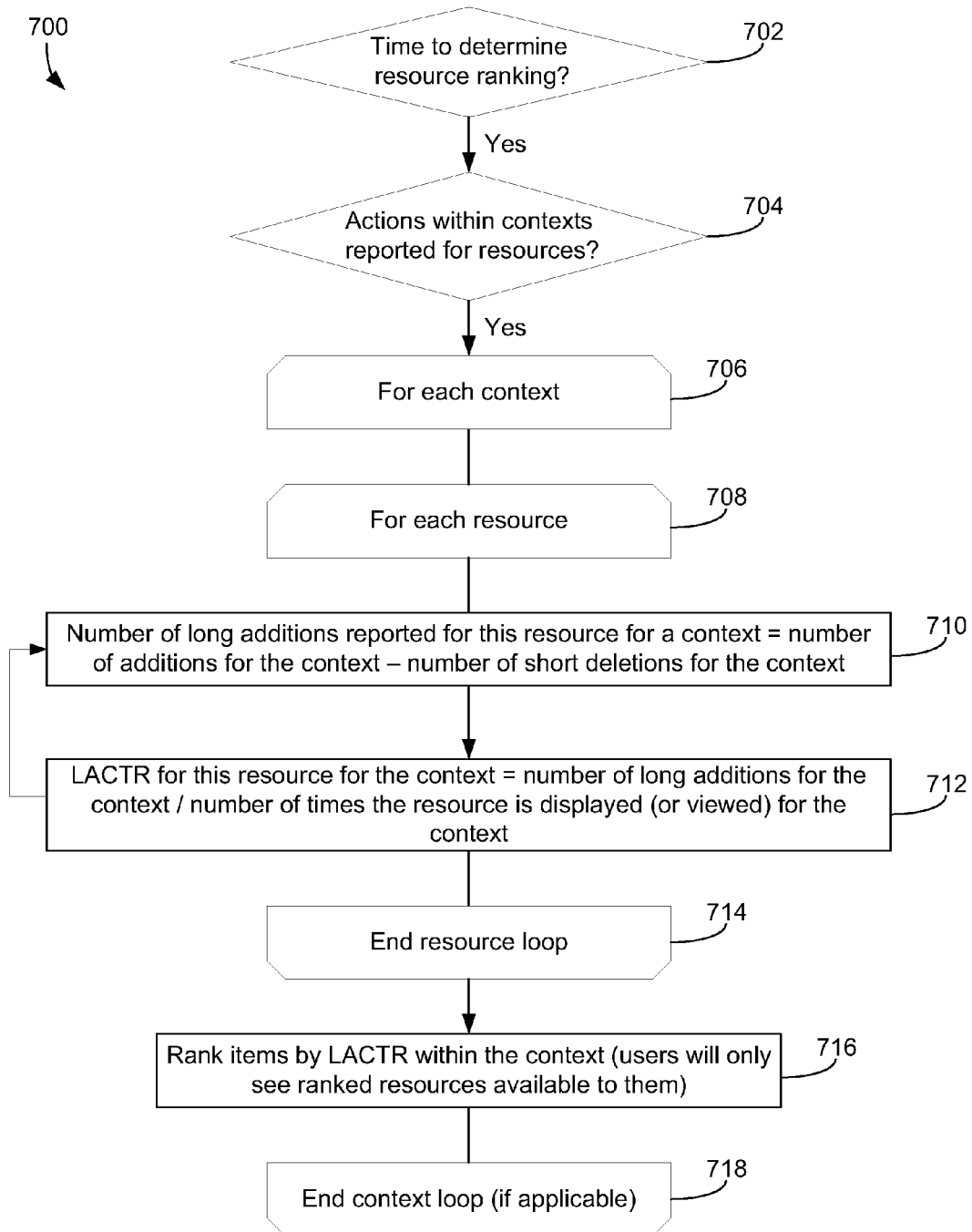
FIG. 7 is a flow diagram of an example process for determining rankings of resources by context.

FIG. 7 is a flow diagram of an example process 700 for determining rankings for resources by context. In some implementations, a LACTR is calculated for a resource for each context (e.g., language, geographic region, category, etc.) in which user actions related to the resource were reported. Resources are ranked within a context according to their LACTRs for that context.

When it is time to determine rankings for resources (702), if actions within contexts have been reported for the resources, a LACTR is calculated for each of the resources for one or more contexts in accordance with the received signals reporting actions for the resources in the contexts (706, 708). A LACTR is calculated for each resource (loop 708, 714) for each of one or more contexts (loop 706, 718) and resources are ranked within each context.

A number of long additions within a context is calculated for a resource (710). The number of long additions in a context is the number of additions for the resource within the context minus the number of short deletions for the resource within the context.

A LACTR is calculated for the resource within the context (712). The LACTR for a resource within the context is the number of long addition for the resource within the context divided by the number of times the resources was displayed within the context. In some implementations, the number of views for the resource within the context is used as the number of times the resource was displayed. The within-context LACTR serves as a score for the resource within a context.

The loop for calculating within-context LACTRs for resources ends when a within-context LACTR is calculated for the resources (714). The resources are ranked within a context by their LACTRs within the context (716) by ordering the resources according to their LACTRs. The higher the LACTR of a resource, the higher the resource is ranked. In some implementations, not all of the resources for which a LACTR was calculated are included in the rankings. For example, a resource may be omitted from the rankings within a context if its LACTR within the context does not meet or exceed a predefined threshold.

The loop of contexts ends when rankings for all of the one or more contexts have been determined (718).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   for each of a plurality of resources presented to a plurality of users by a data processing service:
   receiving one or more signals originating from the data processing service reporting one or more actions by the plurality of users related to the respective resource, wherein a reported action is a presentation of the respective resource, an addition of the respective resource, or a deletion of the respective resource, wherein the reported actions comprise one or more short deletions of the respective resource, a short deletion of the respective resource being a deletion of the respective resource occurring within a predefined time period after a corresponding addition of the respective resource;
   determining a number of long additions for the respective resource by subtracting a number of short deletions of the respective resource from a number of reported additions of the respective resource; and
   determining a respective long-addition click-through rate (LACTR) for the respective resource by dividing the number of long additions for the respective resource by a number of reported presentations of the respective resource;
   ranking the plurality of resources based on the respective LACTRs for the plurality of resources; and
   providing the ranking of the plurality of resources to the data processing service, wherein receiving, determining, ranking, and providing are performed by one or more computers.

2. The method of claim 1, wherein:
providing the ranking of the resources comprises providing representations of at least a subset of the resources in ranking order.

3. The method of claim 1, wherein:
the one or more signals each specify a context in which the respective reported actions occur; and
determining a respective LACTR for the respective resource comprises determining a respective LACTR for the respective resource in the context based on the reported actions related to the respective resource in the context.

4. The method of claim 3, wherein the context is one or more of language, geographic region, or topical category.

5. The method of claim 1, wherein the one or more signals are embedded in one or more Universal Resource Locators (URLs).

6. The method of claim 1, further comprising:
identifying first users of the plurality of users, the first users associated with an action history that indicates a preference for a first resource and a second resource of the plurality of resources;
identifying a second user of the plurality of users, the second users associated with an action history that indicates a preference for the first resource; and
modifying a ranking of the second resource with respect to the second user based on the indicated preference for the first resource by the first and second users.

7. A system, comprising:
one or more processors; and
instructions configured for execution by the one or more processors, the instructions comprising instructions to:
for each of a plurality of resources presented to a plurality of users by a data processing service:
receive one or more signals originating from the data processing service reporting one or more actions by the plurality of users related to the respective resource, wherein a reported action is a presentation of the respective resource, an addition of the respective resource, or a deletion of the respective resource, wherein the reported actions comprise one or more short deletions of the respective resource, a short deletion of the respective resource being a deletion of the respective resource occurring within a predefined time period after a corresponding addition of the respective resource;
including:
determine a number of long additions for the respective resource by subtracting a number of short deletions of the respective resource from a number of reported additions of the respective resource; and
determine a respective long additional click-through rate (LACTR) for the respective resource by dividing the number of long additions for the respective resource by a number of reported presentations of the respective resource;
rank the plurality of resources based on the respective LACTRs for the plurality of resources; and
provide the ranking of the plurality of resources.

8. The system of claim 7, wherein:
the instructions to provide the ranking of the resources comprise instructions to provide representations of at least a subset of the resources in ranking order.

9. The system of claim 7, wherein:
the one or more signals each specify a context in which the respective reported actions occur; and
the instructions to determine a respective LACTR for the respective resource comprise instructions to determine a respective LACTR for the respective resource in the context based on the reported actions related to the respective resource in the context.

10. The system of claim 9, wherein the context is one or more of language, geographic region, or topical category.

11. The system of claim 7, wherein the one or more signals are embedded in one or more Universal Resource Locators (URLs).

12. The system of claim 7, the instructions further comprising instructions to:
identify first users of the plurality of users, the first users associated with an action history that indicates a preference for a first resource and a second resource of the plurality of resources;
identify a second user of the plurality of users, the second users associated with an action history that indicates a preference for the first resource; and
modify a ranking of the second resource with respect to the second user based on the indicated preference for the first resource by the first and second users.

13. A computer storage medium encoded with a computer program, the program comprising instructions that when executed by data processing apparatus cause the data processing apparatus to perform operations comprising:
for each of a plurality of resources presented to a plurality of users by a data processing service:
receiving one or more signals originating from the data processing service reporting one or more actions by the plurality of users related to the respective resource, wherein a reported action is a presentation of the respective resource, an addition of the respective resource, or a deletion of the respective resource, wherein the reported actions comprise one or more short deletions of the respective resource, a short deletion of the respective resource being a deletion of the respective resource occurring within a predefined time period after a corresponding addition of the respective resource;
including:
determining a number of long additions for the respective resource by subtracting a number of short deletions of the respective resource from a number of reported additions of the respective resource; and
determining a respective long addition click-through rate (LACTR) for the respective resource by dividing the number of long additions for the respective resource by a number of reported presentations of the respective resource;
ranking the plurality of resources based on the respective LACTRs for the plurality of resources; and
providing the ranking of the plurality of resources.

14. The computer storage medium of claim 13, wherein:
providing the ranking of the resources comprises providing representations of at least a subset of the resources in ranking order.

15. The computer storage medium of claim 13, wherein:
the one or more signals each specify a context in which the respective reported actions occur; and
determining a respective LACTR for the respective resource comprises determining a respective LACTR for the respective resource in the context based on the reported actions related to the respective resource in the context.

16. The computer storage medium of claim 15, wherein the context is one or more of language, geographic region, or topical category.

17. The computer storage medium of claim 13, wherein the one or more signals are embedded in one or more Universal Resource Locators (URLs).

18. The computer storage medium of claim 13, the operations further comprising:
identifying first users of the plurality of users, the first users associated with an action history that indicates a preference for a first resource and a second resource of the plurality of resources;
identifying a second user of the plurality of users, the second users associated with an action history that indicates a preference for the first resource; and
modifying a ranking of the second resource with respect to the second user based on the indicated preference for the first resource by the first and second users.

* * * * *

UNITED STATES PATENT AND TRADEMARK OFFICE
CERTIFICATE OF CORRECTION

| | | Page 1 of 1 |
|---|---|---|
| PATENT NO. | : 7,953,741 B2 | |
| APPLICATION NO. | : 11/874893 | |
| DATED | : May 31, 2011 | |
| INVENTOR(S) | : Lawrence Wen-Kai Shih et al. | |

It is certified that error appears in the above-identified patent and that said Letters Patent is hereby corrected as shown below:

Column 1, line 9, delete "entirety:" and insert --entirety.--

Signed and Sealed this
Nineteenth Day of July, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,953,741 B2 | Page 1 of 1 |
| APPLICATION NO. | : 11/874893 | |
| DATED | : May 31, 2011 | |
| INVENTOR(S) | : Shih et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 370 days.

Signed and Sealed this
Twentieth Day of December, 2011

David J. Kappos
*Director of the United States Patent and Trademark Office*